United States Patent [19]
Gerard et al.

[11] Patent Number: 4,674,081
[45] Date of Patent: Jun. 16, 1987

[54] MOBIL PRE-ETCHED DATA CARRIER

[75] Inventors: Jean L. Gerard; Claude Bricot, both of Paris, France

[73] Assignee: Thomson CSF, Paris, France

[21] Appl. No.: 757,148

[22] Filed: Jul. 22, 1985

Related U.S. Application Data

[62] Division of Ser. No. 472,995, Mar. 7, 1983, Pat. No. 4,553,228.

[30] Foreign Application Priority Data

Mar. 12, 1982 [FR] France .................. 82 04218

[51] Int. Cl.⁴ .................................. G11B 7/00
[52] U.S. Cl. ...................... 369/275; 369/46
[58] Field of Search .................. 369/43, 44, 45, 46, 369/110, 109, 111, 48, 49, 275

[56] References Cited

U.S. PATENT DOCUMENTS

| | | | |
|---|---|---|---|
| 4,322,836 | 3/1982 | Kinjo et al. | 369/43 |
| 4,428,075 | 1/1984 | Hazel et al. | 369/45 |
| 4,443,870 | 4/1984 | Hazel et al. | 369/44 |

Primary Examiner—Donald McElheny, Jr.
Attorney, Agent, or Firm—Cushman, Darby & Cushman

[57] ABSTRACT

A mobile pre-etched data carrier is provided in which the pre-etching is formed by a succession of discrete non continuous elements materializing the mean axis of the tracks. The spatial distribution of these discrete elements may be uniform or not. In a first embodiment, each discrete element is formed by a smooth track section. In a second embodiment, each discrete element comprises several sections defining a particular code. In other preferred variations of the invention, each element comprises, besides a portion centered on the mean axis of the tracks, one or more portions offset with respect to the axis. Finally, each of the pre-etchings may itself be preceded by an additional pre-etching element used for the purpose of synchronization. The tracking device comprises photodetector means, measuring circuits comprising sampler-inhibitors or storage integrator circuits and sampling circuits. A radial tracking error is formed from the evolution of the signals detected during successive passages.

9 Claims, 11 Drawing Figures

MOBIL PRE-ETCHED DATA CARRIER

This is a division of application Ser. No. 472,995, filed Mar. 7, 1983, now U.S. Pat. No. 4,553,228.

BACKGROUND OF THE INVENTION

The present invention relates to a mobile data carrier more especially in disk form comprising pre-etchings giving material form to tracks along which optically readable data may be recorded. The invention also relates to a device for radially following these tracks.

Numerous radial tracing processes have been described in the prior art. When it is a question of recording data in sequential form, for example video data, generally the tracks are not materialized beforehand but rather created in real time at the time of the recoding. The data is recorded along tracks having the shape of a single spiral extending from the peripheral zone of the disk to a central zone or reversely, or else having the form of concentric circles centered on the axis of rotation of the disk.

In the simplest systems, the accuracy of the members causing the recording head to advance is used for creating this track. During reading, data recorded for example in the form of micro-reliefs, interferes with a reading beam focused in the plane of the recording face of the disk. The movement of these micro-reliefs under the focusing spot modulates the beam and this modulation is detected by means of photoelectric cells converting the light intensity variations into electric signals. These electric signals may also be used for tracking.

The process which has just been described requires the advance of the recording head to have a very high mechanical stability, so as to avoid two successive grooves from overlapping or at least being poorly discernable during reading. For improving the system which has just been described, there has been proposed in U.S. Pat. No. 4,275,275 a process using the last track recorded as reference. With the system for mechanically advancing the recording head is associated a system for optical deflection of the recording spot. The reading spot is forced to follow a groove already recorded on the track by conventional positional control. By means of the optical deflection system, the recording spot is maintained at a constant distance, equal to a whole number multiple of the pitch of the track, from the reading spot.

However, when it is desired to record data in a random fashion, for example in data processing applications, it is no longer possible to use the processes which have just been described or similar processes. It is in general necessary to give beforehand material form to the tracks in front of which data may be recorded. For this, it is usual to create a pre-etching in any form. In one embodiment described in U.S. Pat. Nos. 4,252,889, 4,288,510 and 4,334,007, during manufacture of the data carrier, the tracks are materialized in the form of a smooth groove created in an auxiliary layer of this carrier. These tracks may be detected even in the absence of any data recording, this recording being effected in a subsequent phase in a photosensitive or thermo-sensitive layer in contact with the auxiliary layer.

In a preferred variation of the prior art, the preetched tracks may merge with the regions in which the data is recorded. Then, a so-called monotrack system is formed.

In other processes, the pre-etched track or tracks are distinct from the tracks along which the data is recorded. Then so-called dual track or multi-track systems are formed. To discriminate these two types of track the pre-etching may consist of a signal which may be broken down into a first frequency spectrum and the data which may be broken down into a second separate frequency spectrum. During writing, the reading beam may be used for following the pre-etched track as in the second above-mentioned American patent application.

The main drawback of the process which has just been described is that it does not allow maximum recording density since it requires, at the minimum, an additional preetched track for a pre-etched data track. Furthermore, it requires the use of two beams, one for radially following the etched track and the other for writing in or reading data from the track intended for the recording.

Data carriers of the mono-track type, comprising a pre-etching, are not free from disadvantages either. They generally require the use of two beams, one for recording and the other for radial tracking. Furthermore, though the pre-etched track is easily discernable from the rest of the disk (intertrack zones) in the absence of data recording, it is no longer the case when data is recorded. The result may be, if precautions are not taken, contrast reversals leading to tracking errors.

The present invention provides a mobile data carrier structure with pre-etching in the form of a disk obviating the drawbacks of the prior art and compatible with monotrack-monobeam systems.

SUMMARY OF THE INVENTION

The invention provides then a mobile data carrier comprising at least one face intended for recording, along tracks disposed in a predetermined pattern, optically readable data, the carrier being provided with a pre-etching intended to be detected by optical means for radially following said tracks of an optical radial tracking device further comprising at least one source of radiant energy associated with a lens, so as to form on a reference surface of the disk, at least one track scanning spot when the carrier is set in motion, on which said pre-etching is formed from discrete non contiguous elements materializing the mean axis of said tracks and enclosing zones intended for recording said data.

The invention also relates to an optical tracking device using such a data carrier.

BRIEF DESCRIPTION OF THE DRAWINGS

The invention will be better understood and other features will appear from the following description with reference to the accompanying figures in which.

DESCRIPTION OF THE PREFERRED EMBODIMENTS

Since the invention relates to a data carrier of the pre-etched type and a radial tracking device following one of the tracks of such a data carrier, it is useful to recall the main components of a data carrier recording and/or reading system, more especially data carriers in the form of optically readable and recordable disks.

Figure 1:
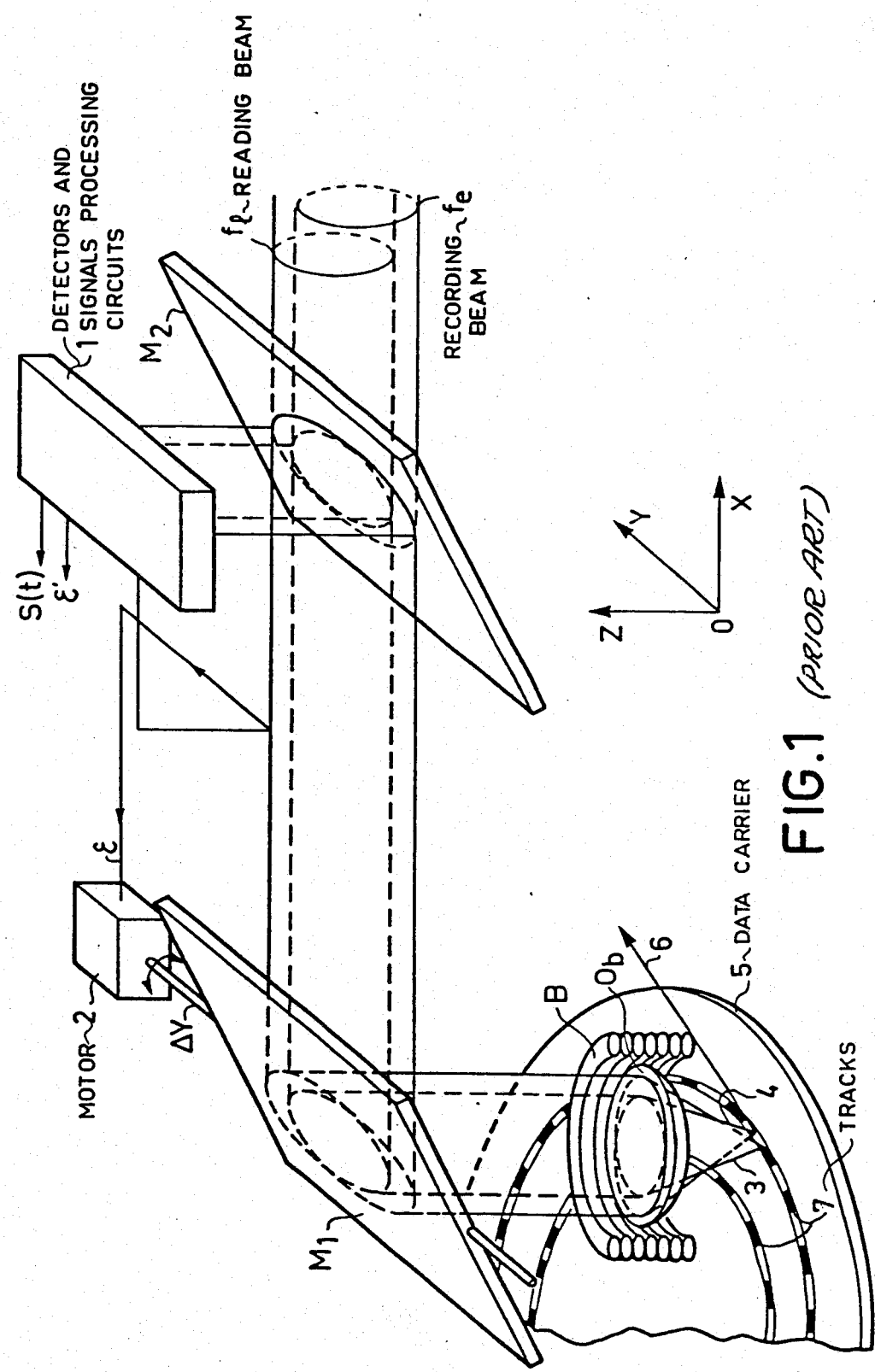
FIG. 1 shows a disk of the prior art and a tracking device for such a disk.

FIG. 1 shows a data carrier 5 of the prior art in the form of a circular disk rotatable in a plane XOY about an axis parallel to the third axis of a reference trihedron XYZ. The lower face of this disk is here assumed smooth; the upper face which is parallel thereto is also smooth, but comprises a pre-etched track 7 in the form of a smooth track whose substantially constant width is of the order or less than a micrometer.

Such a disk may be used either for recording data at a given point on one of the previously recorded smooth tracks or for reading recorded data at any point in this track. The disk, for example of a diameter of about 30 cm, is driven with a rotational movement imparted by a drive motor integral with the chassis of the optical recording-reading system. In this embodiment, the device for acceding to a predetermined track of the disk comprises a fixed part having two light energy sources (not shown in FIG. 1) and a mobile part formed by the recording-reading head. As is known, this latter comprises a lens of the microscope type $O_b$, integral with an electromagnetic coil B moving in the magnetic field of a permanent magnet (not shown) providing vertical control and a galvanometric mirror $M_1$ providing radial control. The light energy sources, as is also known, comprise laser sources, for example HeNe gas or semiconductor lasers. The gas lasers deliver a polarized parallel beam whose section is very small. The laser beam must be enlarged so as to cover the input pupil of the lens, whatever the position of the lens may be along the optical axis. To meet this requirement, it has been proposed, in U.S. patent application Ser. No. 174,564 of July 4, 1980, now U.S. Pat. No. 4,344,164, to insert between the light energy sources and the mobile recording-reading head an afocal type lens.

For reading, a parallel laser beam $f_1$ produced by a laser source (not shown in FIG. 1), is enlarged by means of an afocal lens whose magnification is such that the emergent beam, also parallel, covers the input pupil of lens $O_b$. Mirror $M_1'$ deflects the rays propagated parallel to a direction parallel to axis OX. Lens $O_b$ focuses the reading beam at a point 3 on the data carrying disk 5. This disk is driven with a rotational movement shown symbolically by the arrow 6. The lens and the mirror are integral with a mobile assembly forming the recording-reading head. The advance of this mobile assembly may be provided by any known means.

Then the same afocal lens is used for the recording beam $f_e$, which has been previously modulated. So as to differentiate the reading and recording spots on the disk, the recording beam $f_e$ is very slightly slanted with respect to the reading beam $f_1$ so that the off-centering of the recording beam on the input pupil of the lens is very limited and so that the movement of the beam during radial movement of the head may be neglected. It follows that, whatever the position of the lens along the optical axis, the writing beam is focused at the focal point of the lens. The writing spot is focused at point 4.

The pre-etching of the track in the form of a "smooth" groove 7 may be provided in different ways. It may for example be a question of a hollow preetching, from an assembly of track elements arranged in concentric circles or in a spiral. The width of the track elements is chosen slightly less than the diameter of the light spot and these elements are separated by intertrack areas whose width is slightly greater than the width of the track. The upper surface of the data carrier receives a thin layer appropriate to recording by a thermo-optical process. This arrangement of elements allows the track to be scanned before recording, for the interaction of the reading spot with the track provides a dispersed radiation whereas the intertrack areas do not generate dispersion.

In so far as the disk recording phase is concerned, illumination of the sensitive layer serving for recording is effected by a spot whose intensity is modulated for example by an electric signal composed of square waves of variable or constant widths depending on the applications for which the data carrier is intended. The incorporation of the data in the modulating signal is effected, depending on the case, by frequency or phase modulation, or by any coding method able to provide a pulse coded message; the data may also be itself directly the modulating signal.

For detecting the reading beams reflected by the disk, a semi-transparent plate $M_2$ is placed in the path of beam $f_1$. The reflected beam is then reflected to photodetecting and signal processing means which may deliver on the one hand an error signal $\epsilon'$ for controlling motor 2 for controlling the position of mirror $M_1$, thus forming a radial control, on the other hand an error signal $\epsilon'$ for controlling the coil B integral with lens $O_b$, thus forming a focusing control. All these techniques are well known to a man skilled in the art and are outside the scope of the invention.

The processing means may also deliver a signal S(t) representative of the useful data recorded on the disk. In fact, while the elements recorded ont rack 7 are travelling past, a signal S(t) is collected during reading which faithfully translates the variations in time of the signal recorded on the tract.

In the writing phase, the reading beam $f_1$ is used for ensuring the radial control by means of the pre-etching but may also be used for monitoring the real time the date being recorded.

Although it only requires a surface corresponding to the width of a single track, compared with the processes using one or two pre-etched tracks which are adjacent or enclose the useful track, the process of the prior art which has just been recalled with reference to FIG. 1 presents nevertheless disadvantages.

From the detection point of view, it is as if the tracks were darker than the intertrack zones. Any tacking deviation may then be easily detected by this amplitude contrast. When the layer covering the carrier is subjected to the recording radiation, the recorded zones may be made lighter for some thermo-sensitive materials, which contributes to creating a good constrast along the track. However, these lightened zones tend to merge with the lower density of the neighboring intertracks, which causes the loss in the radial direction of the contrast required for ensuring good tracking.

It can then be seen that recording adversely affects good radial tracking in all the zone where the layer has stored data.

Furthermore, two different beams must be used, at least during the recording periods : a writing beam and a reading and/or radial tracing beam.

The invention provides an optical disk of the preetched type allowing, among other advantages, simultaneously, a monotrack configuration requiring the use of only a single beam, without interference of the pre-etching with the etching representing the useful data.

According to the principal feature of the invention, the pre-etching is in the form of discrete elements or flags which alone define the mean axis of the track to be followed. This track is then virtual. Considering the rotational speed of the disk, the spatial distribution of these pre-etching elements must be sufficient to satisfy the SHANNON criterion: typically, on a disk of a diameter of 30 cm in which a ring 8 cm in width represents the useful recording zone, about 44,000 tracks are available each comprising about 3500 flags.

In what follows, since digital data recording is the principal application contemplated within the scope of the present invention, without this being in any way limiting, a carrier will be described in which the tracks are spaced apart in concentric and equidistant circles.

The useful data is recorded between two successive flags. In this connection, if a recording configuration in block form is desired, the spatial distribution of the flags is preferably uniform.

Figure 2:
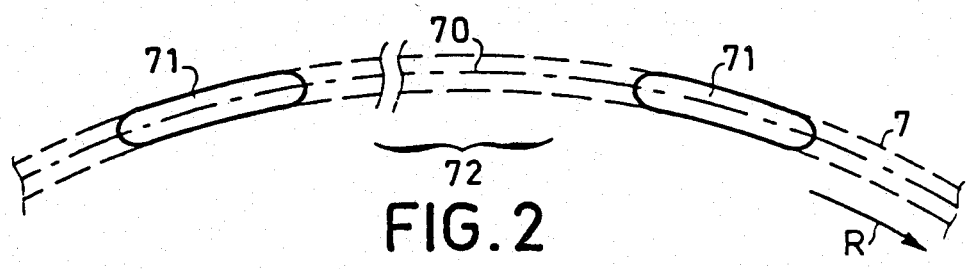
FIGS. 2 to 6 shows a disk pre-etching according to several embodiments of the invention.

FIG. 2 shows a first embodiment in accordance with the invention. The pre-etching is in the form of smooth track sections 71 defining the mean axis 70 along which the data may be recorded. As has just been recalled, between two identical flags 71, there exists a blank zone 72 free of any data before recording. The direction of rotation of the disk has been shown in FIG. 2 by arrow R.

It should of course be understood that track 7 shown in the figure is a virtual track whose mean axis 70 represents the ideal path which a writing beam must follow.

For this, the signals required for radial control of the writing head will be derived from the detection of flags 71 by tracking means which will be described in more detail further on. The recording head may be a head similar to the one shown in FIG. 1. When the pre-etching elements 71 travel past under the focusing spot of a tracking beam which may be the reading beam or, as will also be explained hereafter, the writing beam, a tracking signal may be generated in a conventional way. By way of example, the so-called "push-pull" method may be used which consists in using two photodetecting cells each detecting a fraction of the tracking beam, either after reflection, or after transmission through the disk. The two cells are disposed in the space on each side of the optical axis of the beam and the electrical signals produced by these two cells are transmitted to the inputs of a differential amplifier which effects the algebraic sum thereof. When the spot of the tracking beam is centered on the track, the output signal from the amplifier is zero. When off-centering appears, the amplitude and the sign of this signal are representative of the direction and of the amplitude of this off-centering. This signal is transmitted to the radial control circuit, 2 in FIG. 1.

Unlike known processes, the means for processing the signals must memorize the measurement during the time interval occurring between two sucessive flags passing through the zone illuminated by the tracking spot. According to the invention, the control signal may be inferred from the evolution of the signal measured at these two times.

It is also necessary, if it is only desired to record data in the useful zone 72 located between two successive flags 71, to inhibit the writing beam when one of these flags is in the zone illuminated by the writing spot. Discrimination between the flags and the data recorded between two flags may be facilitated if these flags are given a structure allowing them to be identified selectively.

Figure 3:
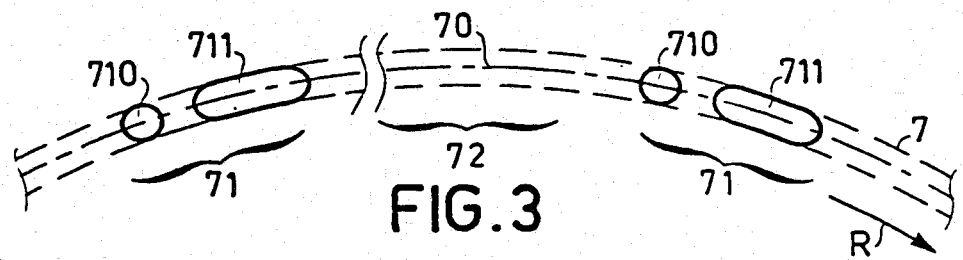

FIG. 3 shows such an embodiment. Each flag 71 is divided into several sections 710,711 whose lengths and spatial distribution define a code allowing a flag to be identified without ambiguity.

To improve the quality of the radial control, it is also known to wobble the tracking beam by imparting thereto a slight oscillation at a fixed frequency on each side of the mean axis of the track. In a preferred variation of the invention, this wobbling may be created by means of a pattern assymetric with respect to the tracking axis 70. For this, each flag comprises, besides one or more sections centered on the means axis of the track and indicating the beginning of the flat, one or more other sections offset with respect to this mean axis.

Figure 4:
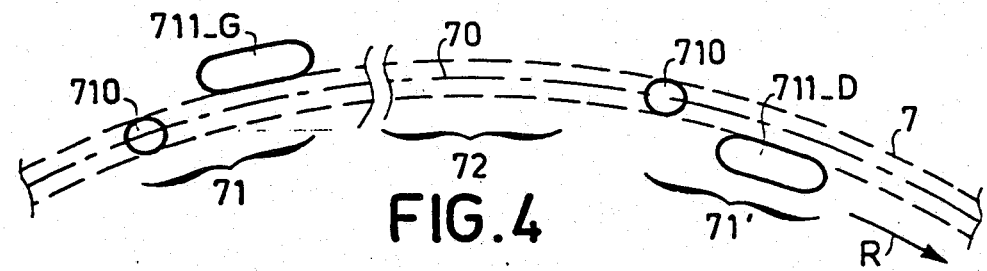

In a first and simplest variation, shown in FIG. 4, a first flag 71 comprises a section 710 centered on the mean axis of track 70 and a second section 711-G offset to the left of this axis. The next flag 71' also comprises a first section 710 centered on the mean axis 70 and a second section 711-D offset to the right of the axis. This succession is repeated. The distance between the two offset sections and axis 70 of the track is of the order of a fraction of the width of the tracking spot.

Figure 5:
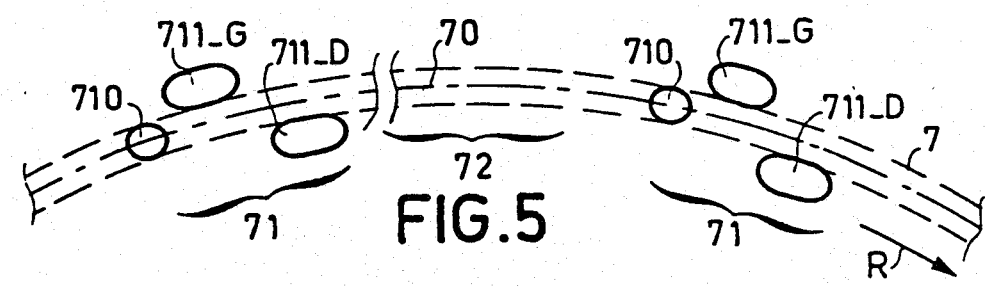

In a second variation, each flag comprises at least one section offset tot he left and one section offset to the right. This variation is illustrated in FIG. 5. This variation presents the advantage of offering a frequency of sampling the tracking error signal double that of the preceding variation. In fact, it is not necessary to wait for two successive flags to pass before elaborating a tracking error signal.

Figure 6:
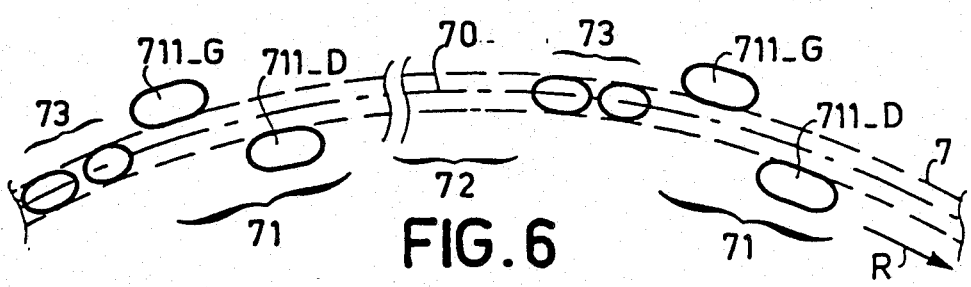

Finally, it may be advantageous to combine the advantages of the structure shown in FIG. 3 with those of the structure illustrated in FIG. 5. Such a configuration is illustrated in FIG. 6. With the principal flag 71, comprising sections offset on each side of the mean axis 70 used for generating a radial tracking error signal, there is associated a second flag 73 used for generating a timing signal. Preferably, flag 73 represents a particular code which allows it to be identified selectively with respect to the other recorded data.

The precise manner in which the data is recorded is outside the scope of the invention. Any known method may be used. Flag 71, 71' and the useful data recorded in zones 72 may, so as to give an idea and without it being in any way limiting, be formed from hollow or raised micro-reliefs, for example by ablation of a surface layer by means of the laser writing beam. Preferably, the flag portions all have the same width and the offset portions 711-G and 711-D have the same length and the same offset.

Figure 7:
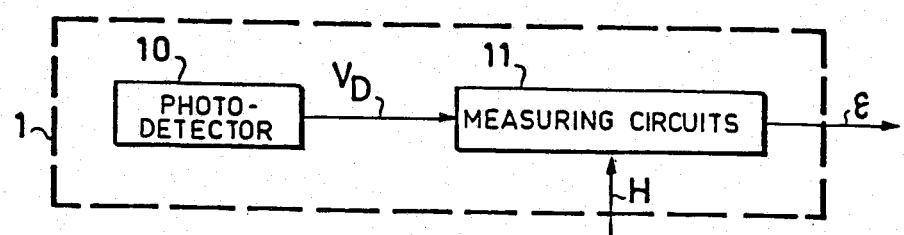
FIGS. 7 to 9 show the electrical diagrams of tracking devices according to several embodiments of the invention.

A tracking device of a type carrying pre-etchings in accordance with the invention, that is to say formed from discrete elements spaced apart along a track and defining useful zones intended for recording data will now be described. The system of recording and writing data on the disk may be similar to the one which has been described with reference to FIG. 1. The identical elements will not be described again. Only the circuit referenced 1, elaborating the radial tracking error signal, is specific. FIG. 7 shows a first simplified variation of such a circuit. This variation is more particularly adapted to preetchings of the type illustrated in FIG. 2. It comprises a photoelectric detector 10 and a measuring circuit 11 elaborating the radial tracking error signal $\epsilon$. Detector 10 may comprise two cells as was recalled above. The output signals from these cells $V_D$ are transmitted to measuring circuits 11 which may comprise a differential amplifier, as has also been described. However, it is necessary, in accordance with the invention, to make measurements only during the time when the flags pass through the zones illuminated by the radial tracking spot. If the data recording is organized in blocks, a clock signal H for timing the measurement may be derived from the length of the blocks and the rotational speed of the disk. These clock pulses may be transmitted to a clock input terminal of an inhibiting-sampling circuit receiving at its other input the signal produced by the differential amplifier and generating at its output a signal $\epsilon$, stored from one pulse to the next, representing the radial tracking deviation. This signal may be smoothed by means of a low-pass filter.

Figure 8:
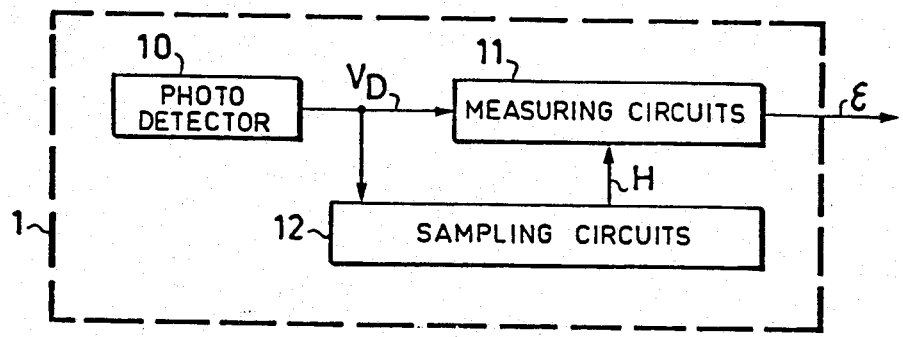

FIG. 8 illustrates a second circuit variation applying more particularly to pre-etchings of the type illustrated in FIG. 3, that is to say coded and identifiable by themselves. The signals $V_D$ are transmitted to sampling circuits 12 comprising a decoder generating a timing signal H transmitted to the measuring circuit when the code read corresponds to the specific code of the flags. The timing signal H enables the measurement to be taken into account and a radial tracking error signal to be generated.

Figure 9:
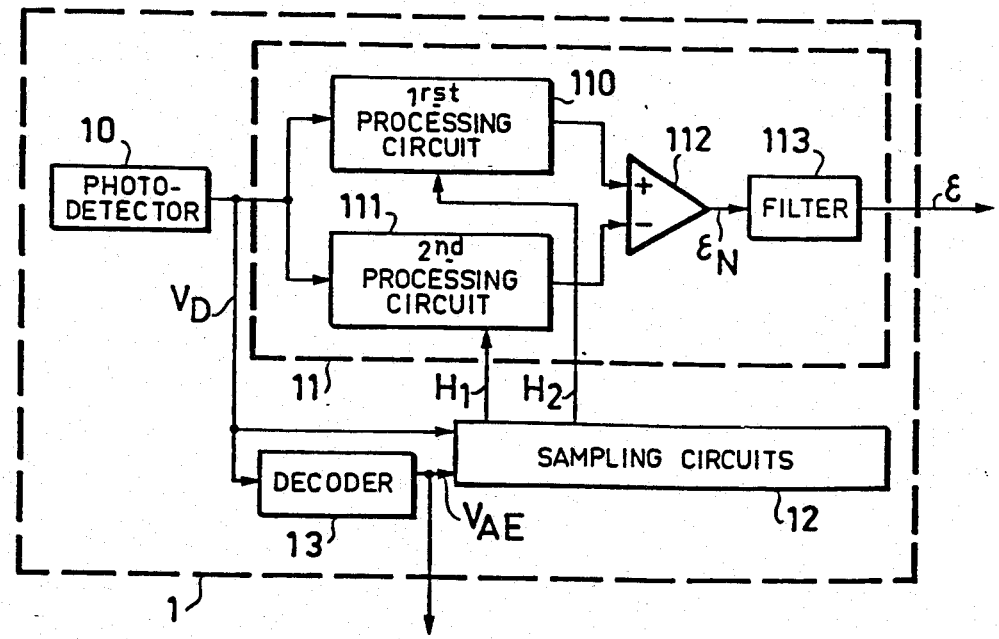

FIG. 9 illustrates a third tracking device variation specially adapted to flags of the type comprising portions offset with respect to the mean axis of the tracks and more particularly to the pre-etching of the type shown in FIG. 6, comprising a first timing flag 73 and a second flag used for elaborating a tracking error signal. The detection means 10 may be formed in this case by a single detector delivering electric signals $V_D$, on the one hand to the measuring circuit 11 and, on the other hand, to sampling circuits 12 and to a decoder 13. This decoder detects selectively the passage of the timing flags 73 through the zone illuminated by the tracking spot and elaborates a sampling enable signal $V_{AE}$ transmitted to the sampling circuits 12. The elaboration of a radial tracking error signal may be effected, according to two main variations, either by peak sampling or, when the offset portions have the same lengths, by integration. With the reading of each of the offset marks 711-G and 711-D is associated a signal processing circuit, respectively 110 and 111. If a peak sampling method is used, these circuits may be formed by circuits of the sampling-inhibitor type. In the second case, when an integration method is used, the circuits may be formed by an integrator associated with a storage circuit. As is known, the integration circuit may be based on a controlled integrator associated with an analog memory (capacitor for example). The sampling circuits 12, whose operation is enabled by the timing signal $V_{AE}$, are provided for elaborating signals $H_1$ and $H_2$ synchronizing the taking into account of the measurements effected respectively in the portions offset to the left and to the right of flag 71. These signals are transmitted to first and second processing circuits 110 and 111. These sampling circuits also receive the signals generated by the detector 10.

Figure 10:
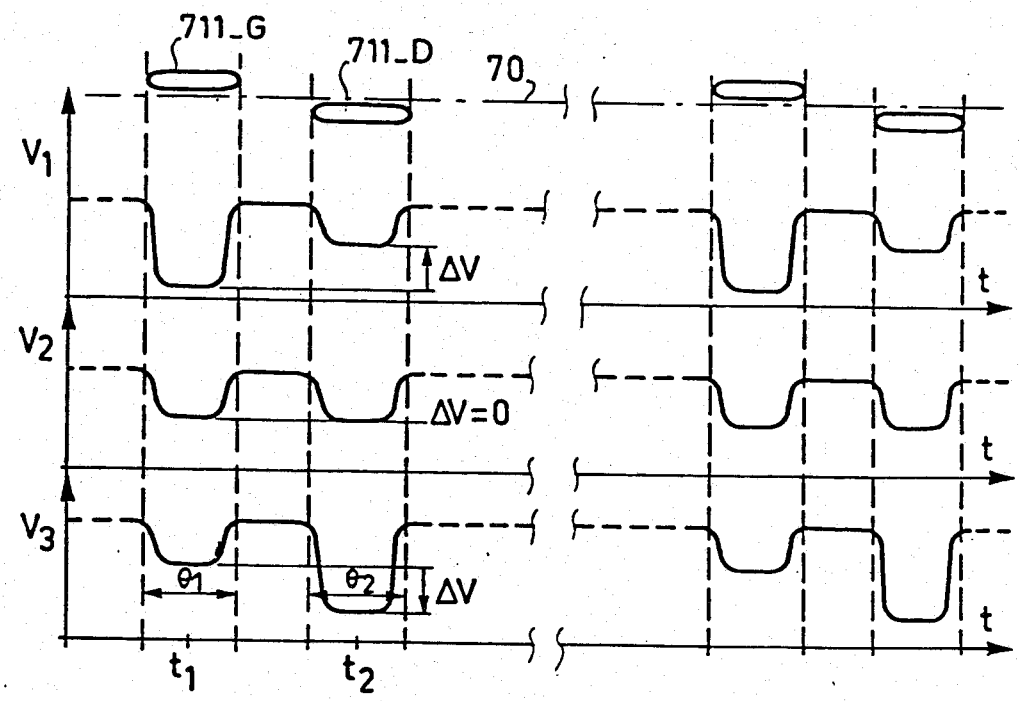
FIGS. 10 and 11 are diagrams for explaining the device of the invention.

The diagram of FIG. 10 illustrates the three characteristic possibilities of the position of the tracking spot with respect to the mean axis of track 70. In the upper part of the diagram, curve $V_1$ illustrates the case where the tracking spot is offset to the left of the mean axis of the track, with the direction of rotation indicated by arror R in FIG. 6. In this case, the interaction of section 711-G on the tracking beam is greater than that of section 711-D. Curve $V_1$ represents the absolute value of the amplitude of the electric signal provided by detection means 10. Signal $V_1$ presents a greater amplitude variation, during the time window $\theta_1$ which corresponds to portion 711-G passing through the zone illuminated by the tracking spot, than the amplitude variation during the time window $\theta_2$ which corresponds to the passage of portion 711-D. The amplitude and sign differences between these two signals are representative of the direction and of the amplitude of the offset of the spot with respect to the mean axis of the track. Outside these windows, in the absence of etching, the signal provided by the detection means remains constant.

In the middle part of the diagram, curve $V_2$ illustrates the case where the tracking spot is centered on the mean axis of the track. The variations of the signal supplied by detection means 1I in windows $\theta_1$ and $\theta_2$ are identical.

In the lower part of the diagram, curve $V_3$ represents the case where the tracking spot is offset to the right with respect to the mean tracking axis.

In an integration process is used, the sampling circuits elaborate from the electric signal supplied by detection means 10 and from the signal enabling decoder $V_{AE}$, two pulses $H_1$ and $H_2$ which coincides with the time windows $\theta_1$ and $\theta_2$. These two pulses enable the operation, during their respective durations, of the first and second integrators 110 and 111.

If the peak sampling process is used, it is then necessary to supply to the two sampler-inhibitor circuits 110 and 111 two pulses of brief duration, $H_1$ and $H_2$, centered on times $t_1$ and $t_2$ in the middle windows $\theta_1$ and $\theta_2$. Each sampler-inhibitor takes into account, for example on the leading edge of the pulse which is transmitted thereto, the signal supplied by detection means 10. The value of the signals thus sampled is then stored until the next measurement. The outputs of the two signal processing circuits 110 and 111 are connected to the inputs of a comparator 112 which may be formed by a differntial amplifier and which supplies at its output a staircase signal $\epsilon_N$ representing the radial tracking error. For this signal to be really usable, it is useful to smooth it by means of a low-pass filter 113 whose output provides the radial tracking error.

Figure 11:
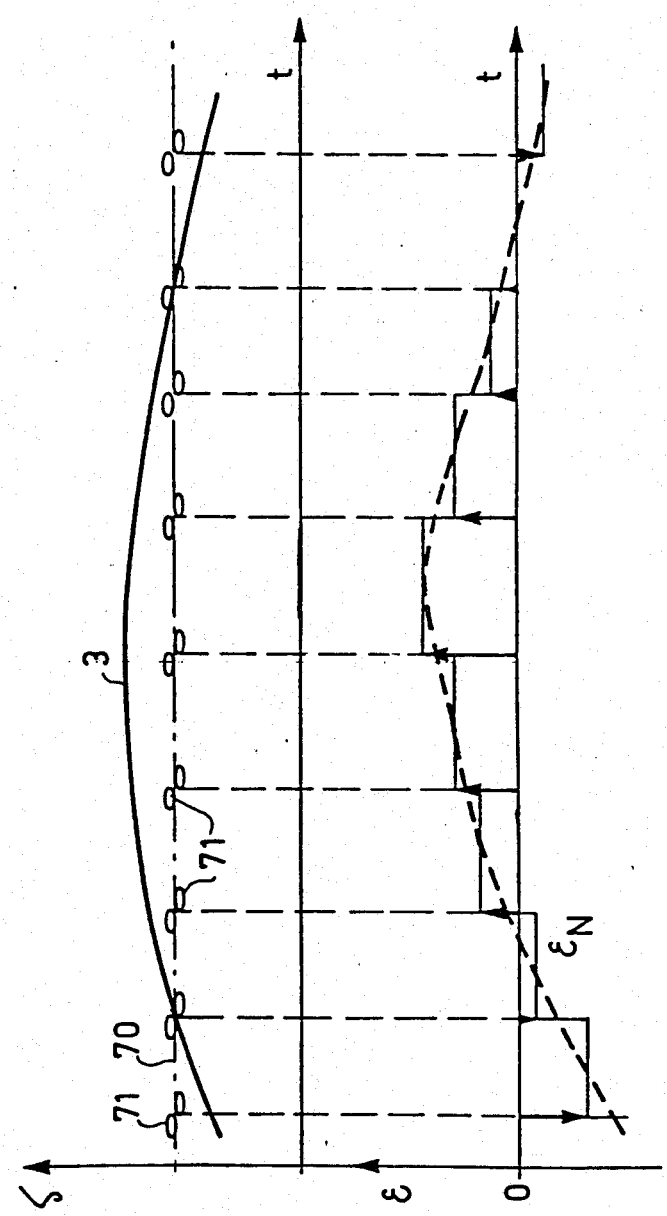

FIG. 11 shows an example of a variation of the offset $\delta$ of the radial trackaign spot 3 with respect to the mean axis 70 of a track as a function of time. In the lower part of the same diagram, there is shown the corresponding variation of the error signal $\epsilon$ as a function of time by the broken line curve. The variation of the radial tracking error digital signal $\epsilon_N$ is also shown in this same diagram. This latter signal varies at the timing of the passaage of flags 71 under the radial tracking spot and it remains constant between two successive passages.

In a preferred variation of the invention, a single beam is used. For this, during the data recording periods, the writing beam is used sequentially as tracking beam during the intervals when flags 71 pass through the zone illuminated by the spot produced by this beam and as writing beam in the other time intervals. For this, the writing circuits are inhibited during passage of the flags. The signal produced by decoder 12, $V_{AE}$, may be used, possibly after logic inversion, for inhibiting the writing circuits. The writing circuits are conventional circuits common in the prior art which do not require a particular description. The same writing beam is also used for reading. For this, as is known, an optical modulator is inserted attenuating the light intensity of this beam for a gas laser. In the case of a semiconductor laser, the intensity of the energy emitted is directly modulatable by the biassing voltage. As previously, signal $V_{AE}$ may be transmitted to the writing circuits for inhibiting such writing during passage of the flags.

The invention presents then the simultaneous advantages of monotrack system, that is to say a maximum recording density, considering that the flags only take up a small area with respect to the useful information, and of the monobeam systems, that is to say simplicity and reduction of cost.

The invention is not limited to the embodiments which have just been described by way of illustration and more especially to the sole flag configurations illustrated om FIGS. 2 to 6.

What is claimed is:

1. A disk shaped data carrier comprising:
   at least one optically recordable reference surface wherein prerecorded marking means consisting of non-contiguous marks of uniform radial width are arranged for discontinuously materializing a multiturn track, the adjacent turns of which are separated from each other by intertrack areas of said reference surface;
   said multiturn track having in said reference surface a mean axis configured as a flat curve akin to a sprial and having a pitch in excess of said radial width;
   non-continguous data storage areas along siad mean axis being alloted to storage of data in optically readable form whereas all said prerecorded marking means are positioned along said mean axis within the gaps between said data storage areas;
   each one of said gaps embodying a specified flag pattern wherein said non-contiguous marks secure a unique lengthwise coded mark configuration selectively identifiable from any mark configuration otherwise recorded along said means axis;
   said lengthwise coded mark configuration comprising one of said non-contiguous marks centered in relation with said mean axis.

2. A disk shaped data carrier as claimed in claim 1, wheein a number of said non-contiguous marks occupying positions symmetrically offset in relation with said mean axis discontinuously materialize a zigzag series whose succesive offset marks pertain to said gaps and are uniformly lengthwise indexed with respect to said flag pattern.

3. A disk shaped data carrier as claimed in claim 2, wherein two successive ones of said offset marks are respectively located in two successive ones of said gaps.

4. A disk shaped data carrier as claimed in claim 2, wherein two successive offset marks are provided in each one of said gaps.

5. A disk shaped data carrier as claimed in claim 2, wherein said offset marks are of uniform length measured in the direction of said mean axis.

6. A disk shaped data carrier as claimed in claim 1, wherein along said mean axis the spatial recurrence of said specified flag pattern is uniform.

7. A disk shaped data carrier in claim 1, wherein said pitch is uniform.

8. A disk shaped data carrier as claimed in claim 1, wherein said flag pattern comprises two successive centered marks having specific lengths and spacing.

9. A disk shaped data carrier as claimed in claim 1, wherein said prerecorded marking means are in the form of surface irregularities distinguishing from surrounding land portions of said reference surface.

* * * * *